(12) United States Patent
Ohyama et al.

(10) Patent No.: US 10,730,148 B2
(45) Date of Patent: Aug. 4, 2020

(54) LASER PROCESSING DEVICE CAPABLE OF REDUCING INTENSITY OF REFLECTED LASER BEAM

(71) Applicant: FANUC CORPORATION, Yamanashi (JP)

(72) Inventors: Akinori Ohyama, Yamanashi (JP); Tatsuya Mochizuki, Yamanashi (JP); Takashi Izumi, Yamanashi (JP); Atsushi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 67 days.

(21) Appl. No.: 15/477,608

(22) Filed: Apr. 3, 2017

(65) Prior Publication Data

US 2017/0282301 A1 Oct. 5, 2017

(30) Foreign Application Priority Data

Apr. 4, 2016 (JP) .................................. 2016-075224

(51) Int. Cl.
*B23K 26/60* (2014.01)
*B23K 26/70* (2014.01)
(Continued)

(52) U.S. Cl.
CPC ............ *B23K 26/705* (2015.10); *B23K 26/03* (2013.01); *B23K 26/032* (2013.01); *B23K 26/04* (2013.01); *B23K 26/60* (2015.10)

(58) Field of Classification Search
CPC .................................................... B23K 26/06; B23K 26/0604; B23K 26/0607; B23K 26/705; B23K 26/60; B23K 26/032; B23K 26/02
(Continued)

(56) References Cited

U.S. PATENT DOCUMENTS 6,441,337 B1 * 8/2002 Isaji ...................... B23K 26/03
219/121.62
6,670,574 B1 12/2003 Bates et al.
(Continued)

FOREIGN PATENT DOCUMENTS

CN 1476951 A 2/2004
CN 103121146 A 5/2013
(Continued)

OTHER PUBLICATIONS

Mys et al., "Use of pre-pulse in laser spot welding of materials with high optical reflection," Proc. SPIE 5063, Fourth International Symposium on Laser Precision Microfabrication, Nov. 18, 2003, 6 pages.

*Primary Examiner* — Dana Ross
*Assistant Examiner* — Ayub A Maye
(74) *Attorney, Agent, or Firm* — RatnerPrestia (57) ABSTRACT

A laser processing device having a function for reducing intensity of a reflected laser beam, without stopping laser oscillation, in order to avoid a malfunction due to the reflected beam. A controller for controlling a laser oscillator has: a laser processing commanding part configured to output a laser processing command; a memory configured to store monitored intensity of the reflected beam and a laser output condition; a pre-processing commanding part configured to command a pre-processing prior to the laser processing command; a comparing part configured to compare the stored intensity of the reflected beam to a first judgment value and/or a second judgment value lower than the first judgment value; an output condition changing part configured to set or change the laser output command of the pre-processing command based on a comparison result; and a pre-processing terminating part configured to terminate the pre-processing based on a predetermined condition.

8 Claims, 8 Drawing Sheets

(51) Int. Cl.
    *B23K 26/03*    (2006.01)
    *B23K 26/04*    (2014.01)

(58) Field of Classification Search
    USPC .............. 219/121.6, 121.61, 121.62, 121.63, 219/121.64, 121.83
    See application file for complete search history.

(56) References Cited

U.S. PATENT DOCUMENTS

| | | | |
|---|---|---|---|
| 8,890,028 | B2 | 11/2014 | Mori |
| 9,517,533 | B2 | 12/2016 | Uchida et al. |
| 9,527,166 | B2 | 12/2016 | Kobayashi et al. |
| 9,559,023 | B2 | 1/2017 | McWhirter et al. |
| 9,603,743 | B2 * | 3/2017 | Rathjen ............... A61F 9/00825 |
| 2001/0027964 | A1 * | 10/2001 | Isaji ....................... B23K 26/03 219/121.62 |
| 2009/0122294 | A1 * | 5/2009 | Okada ................... G01S 7/4812 356/4.01 |
| 2013/0046293 | A1 * | 2/2013 | Arai ....................... A61B 18/24 606/15 |
| 2013/0334181 | A1 * | 12/2013 | Luedi ................. B23K 26/0626 219/121.62 |

FOREIGN PATENT DOCUMENTS

| | | |
|---|---|---|
| CN | 105073331 A | 11/2015 |
| CN | 105142848 A | 12/2015 |
| CN | 105206519 A | 12/2015 |
| JP | H02-179376 A | 7/1990 |
| JP | 2706498 B | 1/1998 |
| JP | 200458141 A | 2/2004 |
| JP | 200474253 A | 3/2004 |
| JP | 2006150373 A | 6/2006 |
| JP | 2006239697 A | 9/2006 |
| JP | 2008238195 A | 10/2008 |
| JP | 2013-146752 | 8/2013 |
| JP | 2017154148 A | 9/2017 |

* cited by examiner

LASER PROCESSING DEVICE CAPABLE OF REDUCING INTENSITY OF REFLECTED LASER BEAM

BACKGROUND OF THE INVENTION

1. Field of the Invention

The present invention relates to a laser processing device for carrying out laser processing, while reducing an intensity of a reflected laser beam from an object to be processed.

2. Description of the Related Art

In some prior art techniques, when laser processing is carried out by irradiating a laser beam onto an object (or a workpiece) such as a metal material to be processed, a reflected laser beam from the workpiece is used to improve welding quality. For example, JP H02-179376 A discloses a laser processing device including: a reflected beam detection means for detecting a level of a laser beam reflected by a workpiece surface and returned into a laser oscillator; a sense means for sensing that the level of the reflected beam falls below a predetermined threshold; and a command means for heating the workpiece by outputting a laser beam at a first output level, and irradiating a laser beam at a second output level so as to pierce the workpiece from when the level of the reflected beam falls below the threshold.

JP 2706498 B discloses a laser processing device including: a reflected beam detection means for detecting a level of a laser beam reflected by a workpiece surface and returned into a laser oscillator; a sense means for sensing that the level of the reflected beam falls below a predetermined threshold; and a command means for starting a piercing process by irradiating a laser beam at a required output level, terminating the piercing process when the level of the reflected beam falls below the threshold, and subsequently outputting a command for the next piercing process.

If an object to be processed is a metal material such as copper or aluminum, which easily reflects a laser beam, when a laser beam is irradiated onto the workpiece, a part of the irradiated laser beam is reflected so as to reversely progress along a path similar to the outward path, and then the part of the laser beam is returned to a laser oscillator as the reflected beam, whereby the laser oscillator or a beam path may be damaged. As such, due to the reflected laser beam returned to the laser oscillator, the laser power cannot be controlled and/or the optical system may be damaged.

As a relevant prior art document for avoiding such a problem, JP 2013-146752 A discloses a laser processing device including: a laser oscillator configured to oscillate a laser beam having a variable output depending on a processing condition; an optical fiber configured to transmit the laser beam; a sensor configured to detect intensity of the beam leaking out from a clad surface of the optical fiber and output a detection signal representing the intensity; and an oscillation controller configured to control the motion of the laser processing device based on the detection signal. This document also recites that the oscillation controller is configured to: compare the intensity obtained from the detection signal to a first threshold determined with respect to an output of the laser oscillator when the output is not higher than a predetermined threshold; compare the intensity obtained from the detection signal to a second threshold determined with respect to the output of the laser oscillator when the output is higher than a predetermined threshold; and control the motion of the laser processing device based on the comparison result.

As described above, in case that the object to be processed is a metal material such as copper or aluminum, by which the laser beam is easily to be reflected, or that an energy density at a processing point is relatively low, when a light condensing point is positioned on a surface of the object, the part of the irradiated laser beam may reversely progress along the path similar to the outward path so as to be returned to the laser oscillator as the reflected beam. As the amount (or intensity) of the reflected beam is high, the probability of the damage of the laser light source or the beam path of the laser processing device may be increased. In the prior art, in order to avoid the excess reflected beam, it is necessary to irradiate the laser beam onto the surface of the object at a tentative processing condition, and then change (or optimize) the processing condition so as to reduce the intensity of the reflected beam, when the intensity of the reflected beam is high enough to create an adverse effect.

Although the technique of JP H02-179376 A or JP 2706498 B is intended to detect the reflected beam (or the scattering light), the technique is not intended to reduce or eliminate the adverse effect of the reflected beam on the laser light source, etc. On the other hand, the technique of JP 2013-146752 A is intended to avoid a problem due to the reflected (returned) beam. However, the oscillation of the laser beam may be stopped when the intensity of the returned beam exceeds the threshold, whereby the availability ratio of the laser processing machine is decreased.

SUMMARY OF THE INVENTION

An object of the present invention is to provide a laser processing device having a function for reducing intensity of a reflected laser beam, without stopping laser oscillation, in order to avoid a malfunction, etc., due to the reflected laser beam.

Accordingly, one aspect of the present invention provides a laser processing device for carrying out laser processing of an object to be processed by irradiating a laser beam onto the object, the laser processing device comprising: a laser processing commanding part configured to output a laser processing command including at least one of laser piercing, laser cutting, laser marking and laser welding; a detector configured to monitor an intensity of a reflected laser beam from the object; a memory configured to store the intensity of the reflected laser beam monitored by the detector, and a laser output condition including a laser power command value, a pulse irradiation time and a pulse interval; a pre-processing commanding part configured to, prior to the laser processing command, command a pre-processing including another laser output condition different from the laser processing command; a comparing part configured to compare the intensity of the reflected laser beam stored in the memory to a first judgment value and/or a second judgment value lower than the first judgment value; an output condition changing part configured to change the laser output command of the pre-processing command, based on a comparison result by the comparing part; and a pre-processing terminating part configured to terminate the pre-processing by the pre-processing command, based on a predetermined condition.

In a preferred embodiment, the output condition changing part is configured to increase a peak value of a laser power, increase the pulse irradiation time, or increase a pulse duty, when the monitored intensity of the reflected laser beam is equal to or less than the second threshold. In this case, the pre-processing terminating part may be configured to terminate the pre-processing when the peak value, the pulse irradiation time or the pulse duty is equal to or higher than a predetermined value.

In a preferred embodiment, the output condition changing part is configured to decrease a peak value of a laser power, decrease the pulse irradiation time, or decrease a pulse duty, when the monitored intensity of the reflected laser beam is equal to or higher than the first threshold. In this case, the pre-processing commanding part may be configured to output an alarm, stop an operation of the laser processing device, or change a processing condition other than the laser output command and execute the pre-processing again, when the peak value, the pulse irradiation time or the pulse duty is equal to or less than a predetermined value.

In a preferred embodiment, the pre-processing terminating part is configured to terminate the pre-processing when the intensity of the reflected laser beam is equal to or less than a predetermined third judgment value.

In a preferred embodiment, the detector is provided to a processing head of the laser processing device.

In a preferred embodiment, at least two detectors are positioned within a laser oscillator of the laser processing device.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
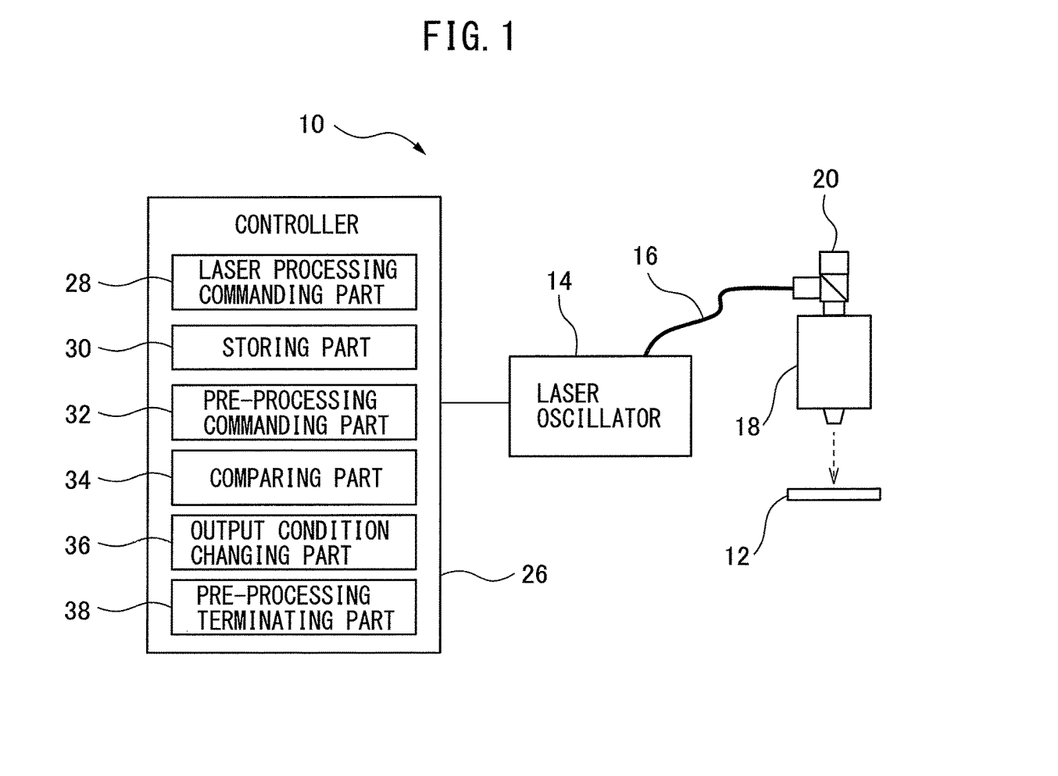
FIG. 1 is a view showing a schematic configuration of a laser processing device according to a preferred embodiment of the present invention.

FIG. 1 shows a schematic configuration of a laser processing (machining) device 10 according to a preferred embodiment of the present invention. Laser processing device 10 is configured to carry out laser processing (machining) including at least one of laser piercing, laser cutting, laser marking and laser welding, by irradiating a laser beam onto an object (or a workpiece 12) to be processed. In the illustrated embodiment, laser processing device 10 has a laser oscillator 14, an optical fiber 16 and a processing (machining) head 18, in which the laser beam, which is output from laser oscillator 14, is transmitted to processing head 18 by optical fiber 16, is condensed by a light condense optical system (not shown), etc., and is irradiated onto a surface of workpiece 12 in a direction generally perpendicular to the surface of workpiece 12.

Laser processing device 10 has a detector 20 configured to detect (or monitor) an intensity of a reflected laser beam from workpiece 12. In the example of FIG. 1, detector 20 is arranged on processing head 18. By positioning detector 20 outside laser oscillator 14, laser oscillator 14 can be constituted at low cost.

Figure 2:
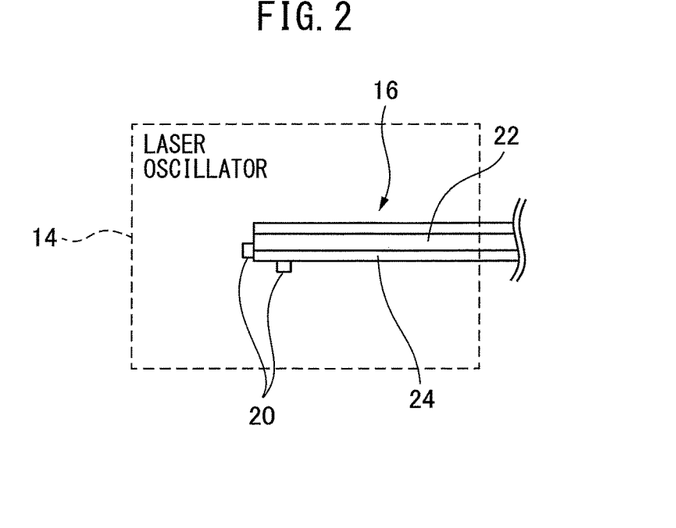
FIG. 2 is a view schematically showing inside a laser oscillator of the laser processing device of FIG. 1.

FIG. 2 shows an example in which detectors are positioned on at least two portions inside laser oscillator 14. In the example of FIG. 2, within laser oscillator 14, one detector 20 is positioned on an axial end of optical fiber 16 constituted by a core 22 and a clad 24, and the other detector 20 is positioned on an outer surface of clad 24. As such, by arranging detectors 20 at the plural portions, the intensity of the reflected beam can be precisely detected or monitored.

As shown in FIG. 1, laser processing device 10 has a controller 26 configured to control laser oscillator 14. Controller 26 has: a laser processing commanding part 28 configured to output a laser processing command including at least one of laser piercing, laser cutting, laser marking and laser welding; a storing part (memory) 30 configured to store the intensity of the reflected laser beam monitored by detector 20, and a laser output condition including a laser power command value, a pulse irradiation time (or a pulse-on time) and a pulse interval; a pre-processing commanding part 32 configured to, prior to the laser processing command, command a pre-processing including another laser output condition different from the laser processing command; a comparing part 34 configured to compare the intensity of the reflected laser beam stored in memory 30 to a first judgment value and/or a second judgment value lower than the first judgment value; an output condition changing part 36 configured to set or change the laser output command of the pre-processing command, based on a comparison result by comparing part 34; and a pre-processing terminating part 38 configured to terminate the pre-processing by the pre-processing command, based on a predetermined condition. In this regard, at least one of the functions of laser processing commanding part 28, memory 30, pre-processing commanding part 32, comparing part 34, output condition changing part 36 and pre-processing terminating part 38 may be provided to a device such as a computer other than controller 26. Further, laser processing commanding part 28, pre-processing commanding part 32, comparing part 34, output condition changing part 36 and pre-processing terminating part 38 may be realized as a CPU (processor), etc.

Figure 3:
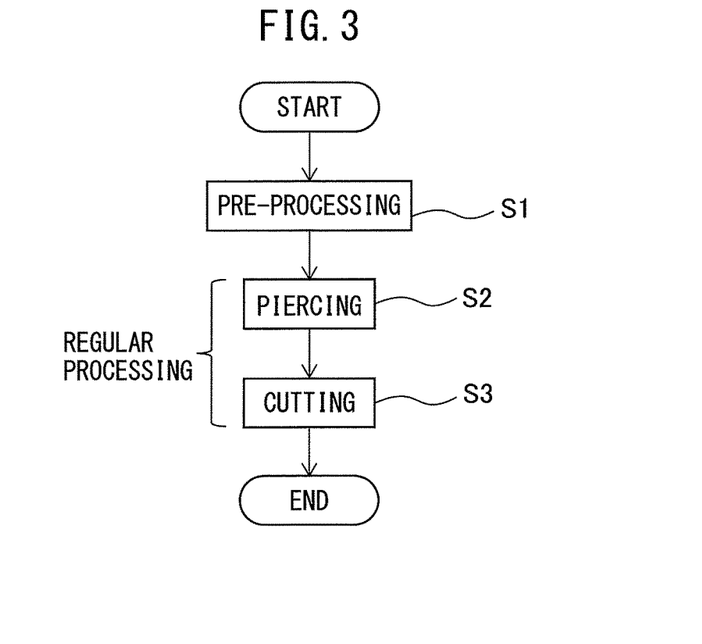
FIG. 3 is a flowchart showing an example of a procedure in the laser processing device of FIG. 1.

FIG. 3 is a flowchart showing an example of a rough procedure of laser processing in laser processing device 10. First, a pre-processing (as described below) is carried out (step S1), and then a main (regular) processing at a predetermined laser output condition is carried out. The main processing may include at least one of laser piercing, laser cutting, laser marking and laser welding. In this example, as the main processing, the piercing is carried out (step S2), and then the cutting is carried out (step S3).

Controller 26 of laser processing device 10 can store and output the laser processing command (or the processing condition) corresponding to the material and/or plate thickness of workpiece 12. The pre-processing command is set based on the laser processing command, and is executed at the time when laser processing is started, prior to the laser processing command. For example, when workpiece 12 to be pierced is an aluminum plate having the thickness of 2 mm, the laser processing command (processing condition) is 3000 W, 100 Hz, 40% (duty), and 1 sec (irradiation time), and the pre-processing condition prior to the laser processing command is 2000 W, 1000 Hz, 10% (duty), and 0.1 sec (irradiation time).

Figure 4:
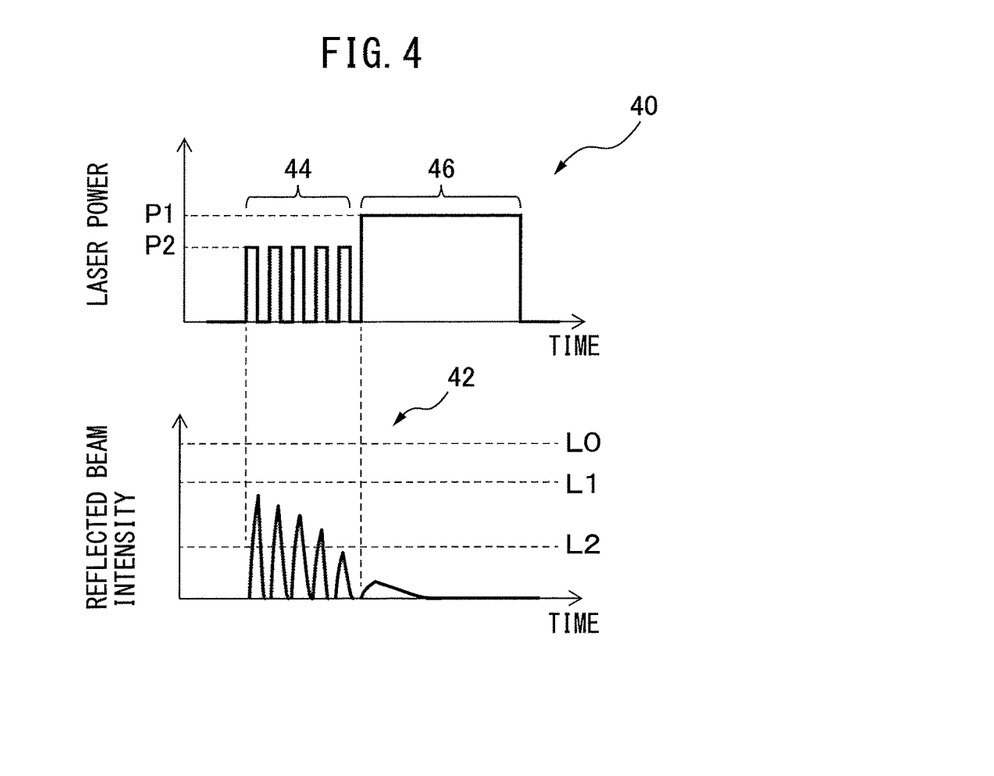
FIG. 4 is a graph exemplifying a temporal change in a laser power and intensity of reflected laser beam in a pre-processing and main processing in the laser processing device of FIG. 1.

FIG. 4 shows an example of temporal change in the laser power and the intensity of the reflected laser beam, in the pre-processing and main processing as described above. Concretely, graphs 40 and 42 represent the temporal change in the laser power and the intensity of the reflected beam, respectively.

In graph 40, prior to the main processing indicated by a reference numeral 46, the pre-processing indicated by a reference numeral 44 is executed based on the pre-processing command including a laser output command different from the laser processing command of the main processing. In the example of FIG. 4, a laser output command value P2 included in the pre-processing command is lower than a laser output command value P1 included in the laser processing command of the main processing.

As indicated by graph 42, when the pre-processing as explained above is executed, the intensity of the reflected beam monitored by detector 20 is lower than intensity L0 (corresponding to an alarm level) at which the laser oscillator may be damaged. Therefore, the laser oscillation is not stopped by the alarm, and the laser oscillator is prevented from being damaged. In the example of FIG. 4, the intensity of the reflected laser beam is lower than a predetermined first judgment value L1 which is lower than intensity L0. In this regard, a case that the monitored intensity is higher than L1 will be explained below.

As exemplified by pre-processing 44 in graph 40, even when the laser beam is irradiated at the same output condition, the surface of the workpiece is likely to absorb, since the workpiece surface is gradually roughened by the laser beam and/or a hole or crater is formed on the workpiece surface, resulting in that the intensity of the reflected laser beam is gradually decreased. In this regard, when the intensity of the reflected beam falls below a predetermined second judgment value L2 which is lower than L1, it can be judged that the main processing can be started without being affected by the reflected beam, and thus the pre-processing can be terminated and the main processing can be started subsequently. As such, the laser (main) processing can be carried out without decreasing the availability ratio by avoiding the alarm for stopping the laser oscillator, and without generating machining defect of the workpiece.

Figure 5:
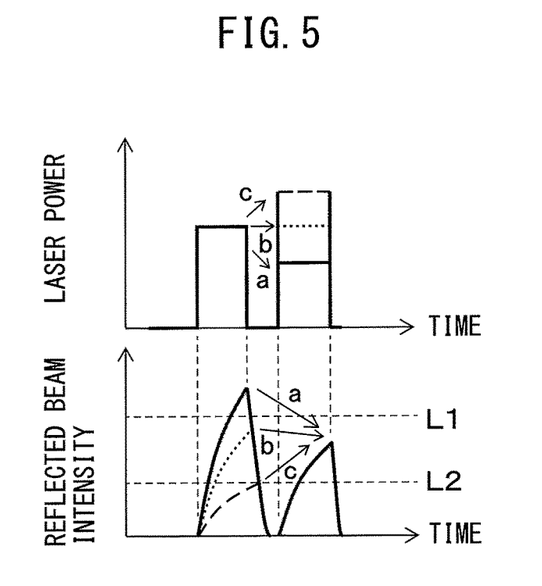
FIG. 5 is a graph explaining an example of the procedure in the pre-processing of FIG. 4, based on a magnitude relationship between the intensity of the reflected beam and a first or second judgment value.
Figure 6:
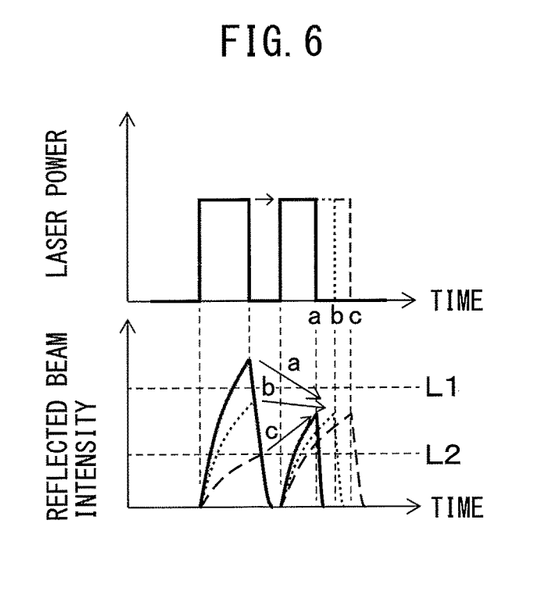
FIG. 6 is a graph explaining another example of the procedure in the pre-processing of FIG. 4, based on a magnitude relationship between the intensity of the reflected beam and a first or second judgment value.

FIGS. 5 and 6 show concrete examples of the procedure in the pre-processing of FIG. 4, based on a magnitude relationship between the intensity of the reflected beam and first judgment value L1 or second judgment value L2.

As indicated by a solid line "a," when the intensity of the reflected laser beam is higher than first judgment value L1, output condition changing part 36 decreases a power peak value of the laser power (or the laser output command value), decreases a pulse irradiation time (or the pulse-on time), or decreases a pulse duty, in order to assuredly prevent the intensity of the reflected beam from reaching the alarm level (L0). Concretely, the power peak value is decreased in the example of FIG. 5, while the pulse irradiation time is decreased in the example of FIG. 6. By virtue of this, the intensity of the reflected beam can be decreased lower than first judgment value L1.

Further, as indicated by a dotted line "b," when the intensity of the reflected laser beam is equal to or lower than first judgment value L1 and is equal to or higher than second judgment value L2, it is not necessary to change the laser output condition.

On the other hand, as indicated by a dashed line "c," when the intensity of the reflected laser beam is lower than second judgment value L2, output condition changing part 36 increases the power peak value, decreases the pulse irradiation time, or increases the pulse duty, in order to increase an amount of heat input into the workpiece. Concretely, the power peak value is increased in the example of FIG. 5, while the pulse irradiation time is increased in the example of FIG. 6. By virtue of this, the intensity of the reflected beam can be increased higher than second judgment value L2.

Figure 7:
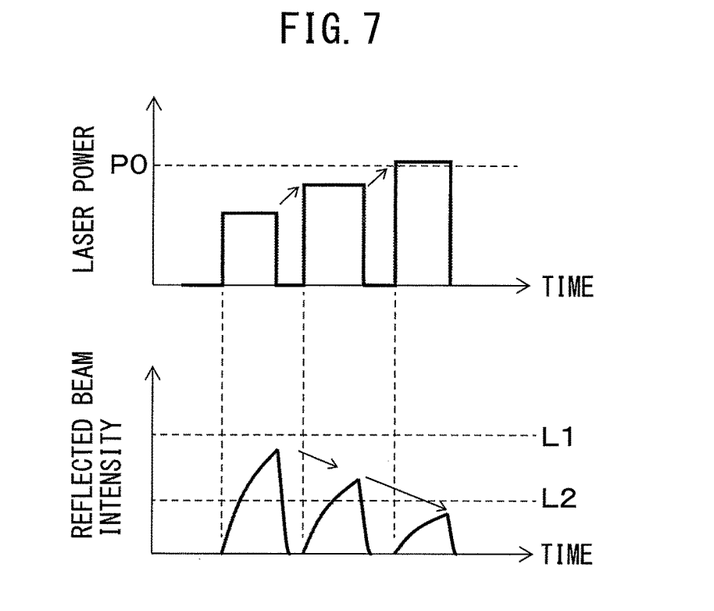
FIG. 7 is a graph explaining an example of the procedure for terminating the pre-processing, when a power peak value, a pulse irradiation time or a pulse duty is equal to or higher than a predetermined value.

FIG. 7 is a view explaining an example of the procedure for terminating the pre-processing, when the power peak value, the pulse irradiation time or the pulse duty is equal to or higher than a predetermined value. After a certain amount of laser beam is absorbed into the workpiece surface, the workpiece surface is deteriorated, whereby the laser beam is more likely to be absorbed into the workpiece. In such a case, even when the intensity of the irradiated laser beam is increased, the intensity of the reflected beam is not disadvantageously increased. Therefore, as shown in FIG. 7, the power peak value may be increased in a step-by-step manner, whereby the amount of heat input into the workpiece can be efficiently increased.

A predetermined value as an upper limit may be set to the power peak value. When the intensity of the reflected beam is not higher than first judgment value L1 (preferably, not higher than second judgment value L2) even if the power peak value is increased to the upper limit, it can judged that the workpiece surface is roughened or deteriorated and the amount of the reflected beam is relatively low. Therefore, it can be set that the pre-processing command is terminated when the power peak value reaches or exceeds predetermined value P0 (exemplified by a third step in FIG. 7). In this regard, value P0 may be set to an appropriate value, for example, to a rated power output value.

Figure 8:
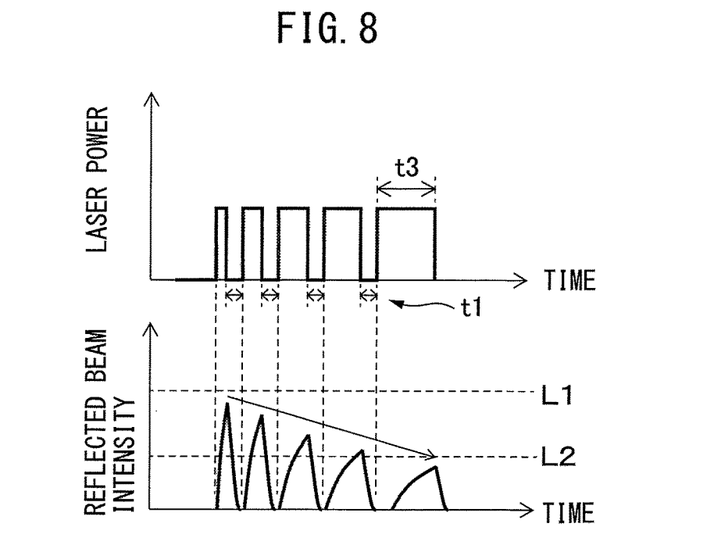
FIG. 8 is a graph showing an alternative example of FIG. 7.
Figure 9:
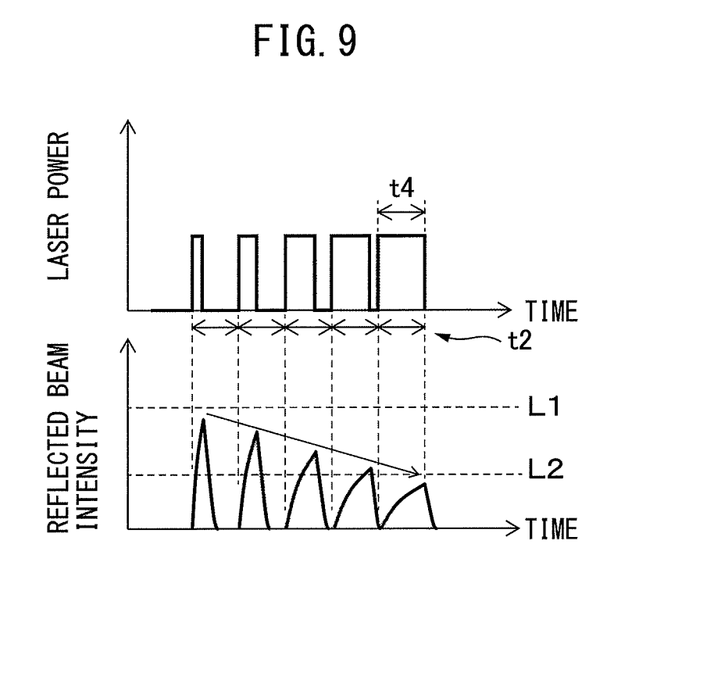
FIG. 9 is a graph showing another alternative example of FIG. 7.

FIGS. 8 and 9 show alternative examples of FIG. 7. FIG. 8 shows an example for increasing the amount of heat input into the workpiece, wherein a pulse-off time t1 (in which the pulse-irradiation is not carried out) is constant, and the pulse-on time (or the pulse irradiation time) is increased step-by-step. FIG. 9 shows another example for increasing the amount of heat input into the workpiece, wherein a pulse period t2 is constant, and the pulse duty is increased step-by-step.

As shown in FIG. 8, an upper limit t3 may be set to the pulse irradiation time. When the intensity of the reflected beam is not higher than first judgment value L1 (preferably, not higher than second judgment value L2) even if the pulse irradiation time is increased to upper limit t3, it can judged that the workpiece surface is roughened or deteriorated and the amount of the reflected beam is relatively low. Therefore, it can be set that the pre-processing command is terminated when the pulse irradiation time reaches or exceeds the predetermined upper limit.

Similarly to FIG. 8, as shown in FIG. 9, an upper limit t4 may be set to the pulse duty. When the intensity of the reflected beam is not higher than first judgment value L1 (preferably, not higher than second judgment value L2) even if the pulse duty is increased to upper limit t4, it can judged that the workpiece surface is roughened or deteriorated and the amount of the reflected beam is relatively low. Therefore, it can be set that the pre-processing command is terminated when the pulse duty reaches or exceeds the predetermined upper limit.

Figure 10:
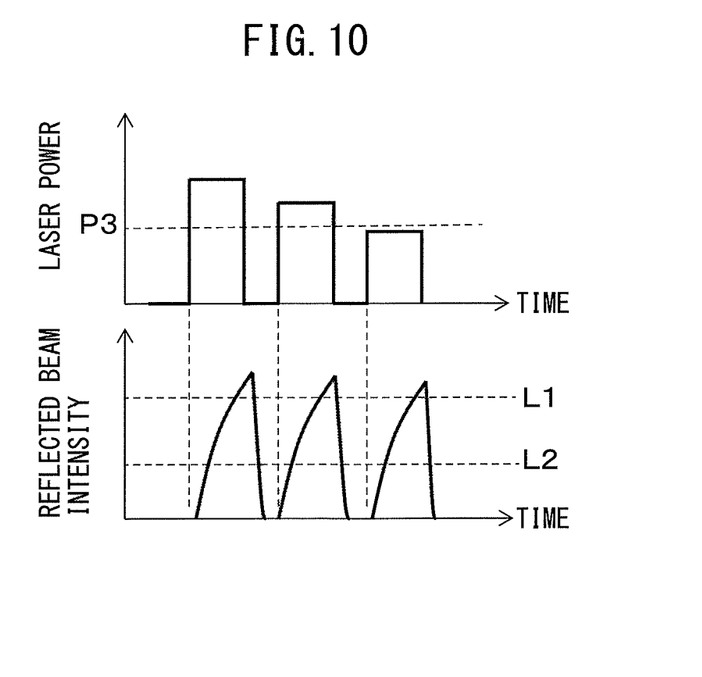
FIG. 10 is a graph explaining an example of the procedure for outputting an alarm, stopping an operation of the laser processing device, or changing a processing condition other than the laser output command and executing the pre-processing again, when the power peak value is equal to or less than a predetermined value.

FIG. 10 shows an example of the procedure for outputting the alarm, stopping the operation of the laser processing device, or changing the processing condition other than the laser output command and executing the pre-processing again, when the power peak value is equal to or less than a predetermined value. A lower limit P3 may be set to the power peak value. As shown in (a third step of) FIG. 10, when the intensity of the reflected beam does not fall below first judgment value L1 even if the power peak value is decreased lower than lower limit P3, it can be judged that the workpiece surface is not sufficiently roughened or deteriorated. If the pre-processing is terminated at this stage, the intensity of the reflected beam will become relatively high when the next (main) laser processing command is executed, whereby the laser oscillator may be damaged. Therefore, in such a case, it is preferable that pre-processing commanding part 32 output the alarm, stop the operation of the laser processing device, or change the processing condition other than the laser output command and execute the pre-processing again.

Figure 11:
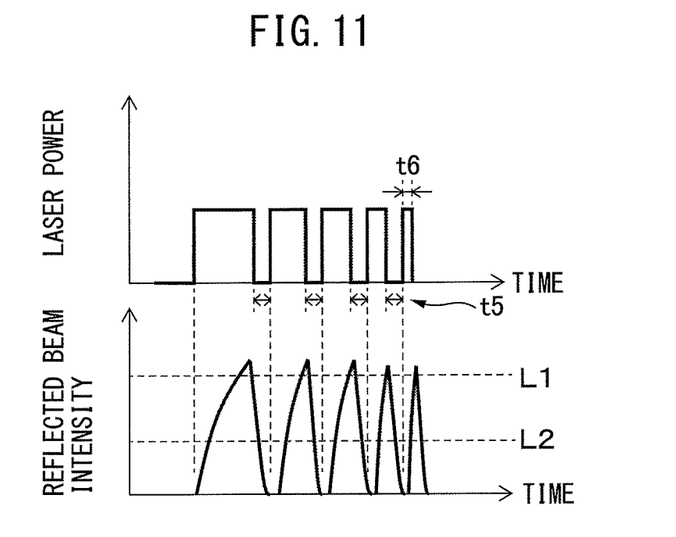
FIG. 11 is a graph explaining an example of the procedure for outputting an alarm, stopping an operation of the laser processing device, or changing a processing condition other than the laser output command and executing the pre-processing again, when the pulse irradiation time is equal to or less than a predetermined value.
Figure 12:
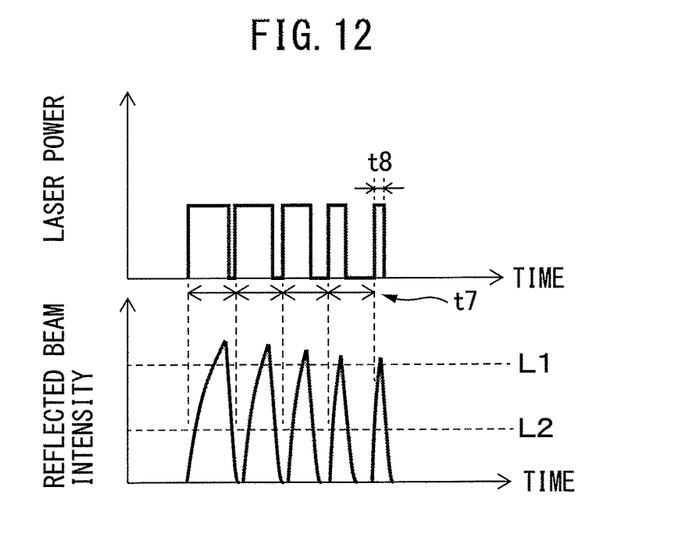
FIG. 12 is a graph explaining an example of the procedure for outputting an alarm, stopping an operation of the laser processing device, or changing a processing condition other than the laser output command and executing the pre-processing again, when the pulse duty is equal to or less than a predetermined value.

FIGS. 11 and 12 show alternative examples of FIG. 10. FIG. 11 shows an example for gradually decreasing the pulse irradiation time while keeping a pulse-off time t5 constant, wherein the intensity of the reflected beam does not fall below first judgment value L1 even if the pulse irradiation time falls below a predetermined lower limit t6 (a fifth step). FIG. 12 shows an example for gradually decreasing the pulse duty while keeping a pulse period t7 constant, wherein the intensity of the reflected beam does not fall below first judgment value L1 even if the pulse duty falls below a predetermined lower limit t8 (a fifth step). In these cases, it can be judged that the workpiece surface is not sufficiently roughened or deteriorated. If the pre-processing is terminated at this stage, the intensity of the reflected beam will become relatively high when the next (main) laser processing command is executed, whereby the laser oscillator may be damaged. Therefore, when the pulse-irradiation time or the pulse duty does not fall below the predetermined lower limit, it is preferable that pre-processing commanding part 32 output the alarm, stop the operation of the laser processing device, or change the processing condition (for example, the height of the beam focal point) other than the laser output command and execute the pre-processing again.

Figure 13:
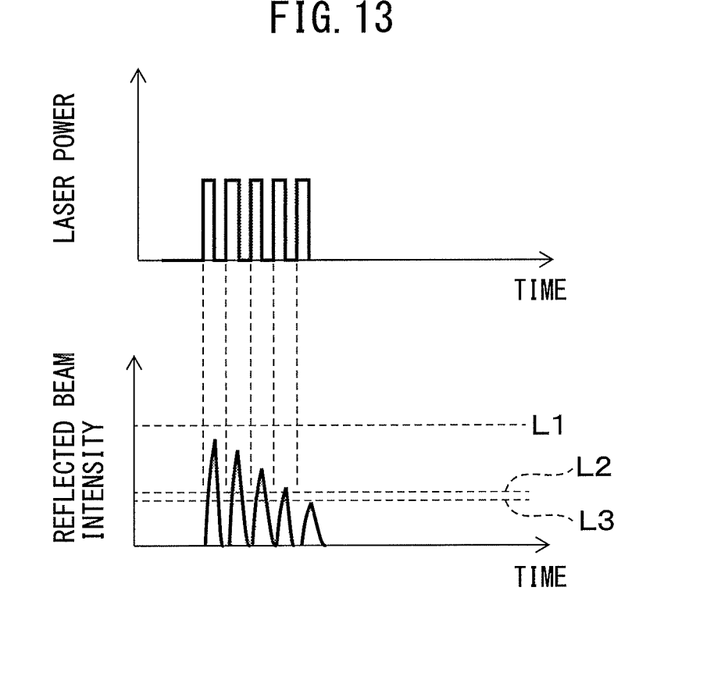
FIG. 13 is a graph exemplifying the procedure for terminating the pre-processing when the intensity of the reflected laser beam is equal to or less than a predetermined third judgment value.

FIG. 13 shows an example of the procedure for terminating the pre-processing when the intensity of the reflected laser beam is equal to or less than a predetermined third judgment value L3. Third judgment value L3, lower than second judgment value L2, may be set to the intensity of the reflected laser beam. As explained above, when the workpiece surface is roughened and the amount of the reflected beam is relatively low, the pre-processing may be terminated and the next laser processing may be subsequently executed. Therefore, by determining third judgment value L3 as a threshold representing the sufficiently low intensity of the reflected beam, and by terminating the pre-processing when the intensity of the reflected beam reaches or falls below third judgment value L3, the period of time of the pre-processing can be reduced.

Figure 14:
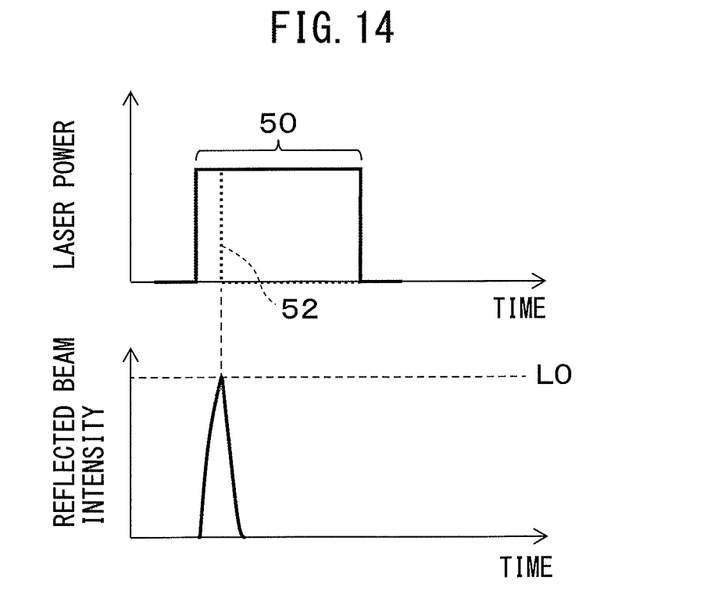
FIG. 14 shows a comparative example relative to the embodiment, showing a relationship between the laser power and intensity of reflected beam in a conventional laser processing device.
Figure 15:
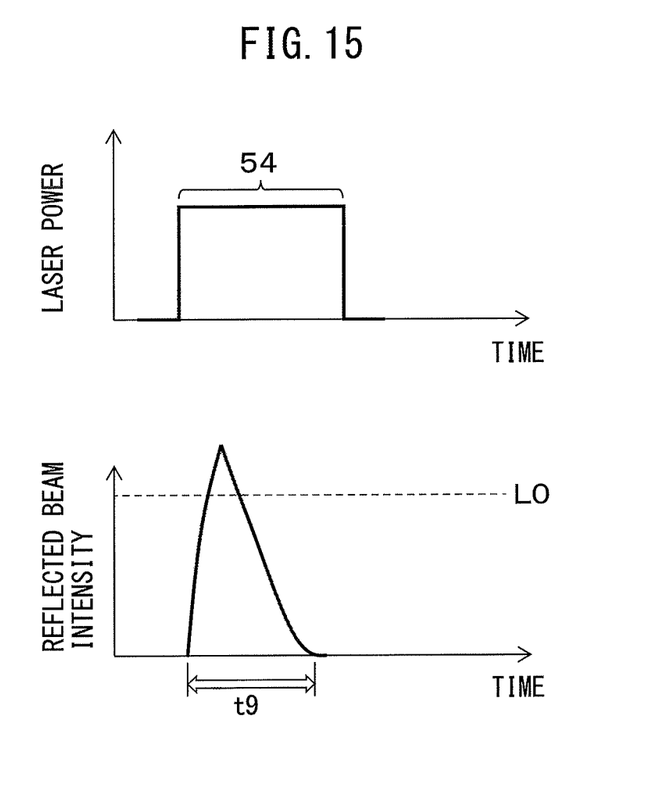
FIG. 15 shows another comparative example relative to the embodiment, showing a relationship between the laser power and intensity of reflected beam in the conventional laser processing device.

FIGS. 14 and 15 are graphs of comparative examples relative to the embodiment, each showing a relationship between the laser power and the intensity of reflected laser beam in a conventional laser processing device. The example of FIG. 14 shows that, when the intensity of the reflected beam reaches predetermined threshold L0 (or the alarm level) during the main processing (such as piercing, cutting or marking) indicated by reference numeral 50 is executed, the laser power is stopped as indicated by a dotted line 52. In this example, machining defect of the workpiece may occur and/or the availability ratio of the laser processing device may be lowered, due to the stoppage of the laser oscillation.

On the other hand, The example of FIG. 15 shows that, even when the intensity of the reflected beam reaches predetermined threshold L0 (or the alarm level) during the main processing (such as piercing, cutting or marking) indicated by reference numeral 54 is executed, the alarm setting is invalid and/or an alarm mask period of time t9 is set. In this example, the laser oscillator may be damaged due to the excessive reflected laser beam, and/or mechanical life of the laser oscillator may be shortened.

To the contrary, in the embodiment of the present invention, at the processing start point on the workpiece, the pre-processing is carried out at the laser power, the reflected beam by which is sufficiently low to not output an alarm the reflected laser beam, while monitoring and storing the intensity of the reflected beam. Therefore, the workpiece surface is deteriorated so that the intensity of the reflected beam thereafter is reduced, whereby the main processing (such as piercing, cutting, marking or welding) can be subsequently executed without stopping the laser oscillation.

According to the laser processing device of the above embodiment, the workpiece surface can be roughened at the laser processing condition, by which the laser oscillator is not damaged, and the intensity of the reflected beam can be lowered due to the roughened surface. Therefore, a problem, regarding the machining defect and/or the decrease in availability ratio due to the stoppage of the laser oscillation based on the alarm, can be avoided. Further, a malfunction of the laser oscillator due to the reflected beam can be avoided.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser processing device for carrying out laser processing of an object to be processed by irradiating a laser beam onto the object, the laser processing device comprising:
a laser processing commanding part configured to output a laser processing command including at least one of laser piercing, laser cutting, laser marking and laser welding;
a detector configured to monitor an intensity of a reflected laser beam from the object;
a memory configured to store the intensity of the reflected laser beam monitored by the detector, and a laser output condition including a laser power command value, a pulse irradiation time and a pulse interval;
a pre-processing commanding part configured to, prior to the laser processing command, command a pre-processing including another laser output condition different from the laser processing command;
a comparing part configured to compare the intensity of the reflected laser beam stored in the memory to a first intensity threshold value and/or a second intensity threshold value lower than the first intensity threshold value;
an output condition changing part configured to repeatedly:
adjust the laser output command of the pre-processing command to increase at least one of a laser power, a pulse irradiation time and a pulse duty, in response to a comparison result by the comparing part indicating that the intensity of the reflected laser beam is less than the first intensity threshold value and greater than the second intensity threshold value, and
adjust the laser output command of the pre-processing command to decrease the at least one of the laser power, the pulse irradiation time and the pulse duty, in response to the comparison result by the comparing part indicating that the intensity of the reflected laser beam is greater than the first intensity threshold value; and
a pre-processing terminating part configured to terminate the pre-processing by the pre-processing command, based on a predetermined condition.

2. The laser processing device as set forth in claim 1, wherein the output condition changing part is configured to increase a peak value of a laser power, increase the pulse irradiation time, or increase a pulse duty, when the monitored intensity of the reflected laser beam is equal to or less than the second threshold.

3. The laser processing device as set forth in claim 1, wherein the output condition changing part is configured to decrease a peak value of a laser power, decrease the pulse irradiation time, or decrease a pulse duty, when the monitored intensity of the reflected laser beam is equal to or higher than the first threshold.

4. The laser processing device as set forth in claim 1, wherein the pre-processing terminating part is configured to terminate the pre-processing when the intensity of the reflected laser beam is equal to or less than a predetermined third intensity threshold value.

5. The laser processing device as set forth in claim 1, wherein the detector is provided to a processing head of the laser processing device.

6. The laser processing device as set forth in claim 1, wherein at least two detectors are positioned within a laser oscillator of the laser processing device.

7. The laser processing device as set forth in claim 2, wherein the pre-processing terminating part is configured to terminate the pre-processing when the peak value, the pulse irradiation time or the pulse duty is equal to or higher than a predetermined value.

8. The laser processing device as set forth in claim 3, wherein the pre-processing commanding part is configured to output the alarm, stop an operation of the laser processing device, or change a processing condition other than the laser output command and execute the pre-processing again, when the peak value, the pulse irradiation time or the pulse duty is equal to or less than a predetermined value.

\* \* \* \* \*